(12) United States Patent
Lopez

(10) Patent No.: US 6,742,797 B2
(45) Date of Patent: Jun. 1, 2004

(54) TRANSFORMABLE TRICYCLE AND VARIATIONS

(76) Inventor: Zenon Lopez, P.O. Box 5874, Pahrump, NV (US) 89041

( * ) Notice: Subject to any disclaimer, the term of this patent is extended or adjusted under 35 U.S.C. 154(b) by 0 days.

(21) Appl. No.: 10/349,933

(22) Filed: Jan. 24, 2003

(65) Prior Publication Data

US 2003/0151225 A1 Aug. 14, 2003

Related U.S. Application Data

(60) Provisional application No. 60/355,981, filed on Feb. 12, 2002.

(51) Int. Cl.$^7$ ................................................. B62K 5/00
(52) U.S. Cl. ..................... 280/287; 280/282; 280/62; 280/259
(58) Field of Search ................................ 280/282, 287, 280/62, 259

(56) References Cited

U.S. PATENT DOCUMENTS

| | | | | |
|---|---|---|---|---|
| 3,429,584 A | * | 2/1969 | Hendricks | 280/281 |
| 4,283,070 A | * | 8/1981 | Forrestall et al. | 280/274 |
| 4,451,064 A | * | 5/1984 | Perkins | 280/259 |
| 4,925,202 A | * | 5/1990 | Barker | 280/261 |
| 4,966,381 A | * | 10/1990 | Feikema | 280/261 |
| 5,145,196 A | * | 9/1992 | Langkamp | 280/278 |
| 5,209,506 A | * | 5/1993 | Klopfenstein | 280/240 |
| 5,280,937 A | * | 1/1994 | Needham | 280/259 |
| 5,468,006 A | * | 11/1995 | Delserro | 280/202 |
| 5,853,184 A | * | 12/1998 | Lofgren et al. | 280/242.1 |
| 5,863,058 A | * | 1/1999 | Jinks | 280/202 |
| 6,257,607 B1 | * | 7/2001 | Franks | 280/242.1 |
| 6,572,129 B1 | * | 6/2003 | Bean | 280/234 |

* cited by examiner

Primary Examiner—Kevin Hurley
Assistant Examiner—Paul Royal, Jr.
(74) Attorney, Agent, or Firm—Sturm & Fix LLP

(57) ABSTRACT

An improved foldable tricycle that extends and transforms to accommodate one, two, or three riders. The tricycle has a front wheel traction with a sprocket secured to the front portion of the front fork with a continuous chain going from the sprocket to the front wheel. The tricycle has a steering assembly which is pivotally secured to the front portion of a frame assembly. A front wheel is rotatably attached to the front fork which is used for the traction, and two rear wheels are rotatably secured to the rear portion of the frame assembly. A releaseable pin that is located below the seat on the frame assembly is released and pulled up to allow the rear wheels to go inwards and towards the front making the tricycle narrow and short in length for storing or transporting. An optional extension frame with a seat on top is used to accommodate a second passenger.

2 Claims, 8 Drawing Sheets

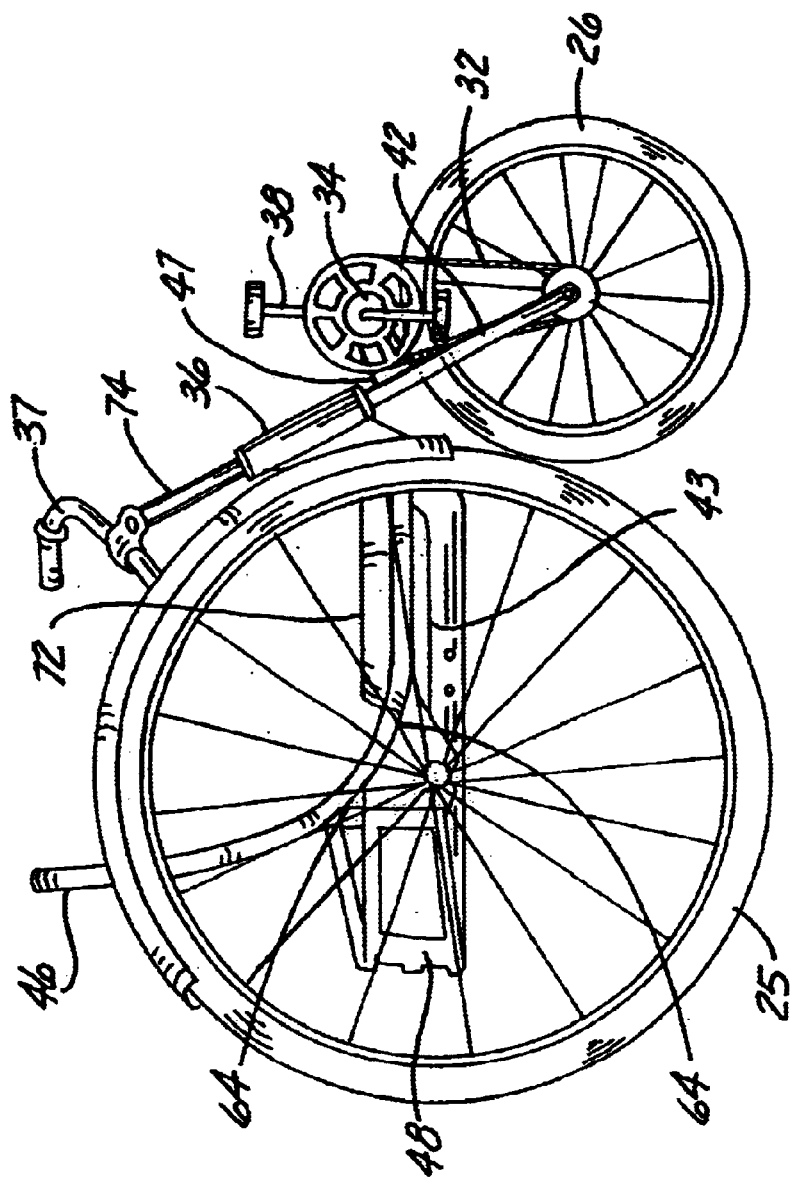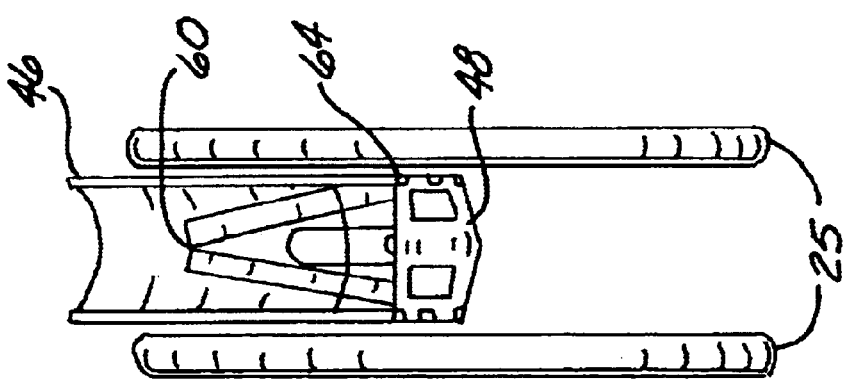

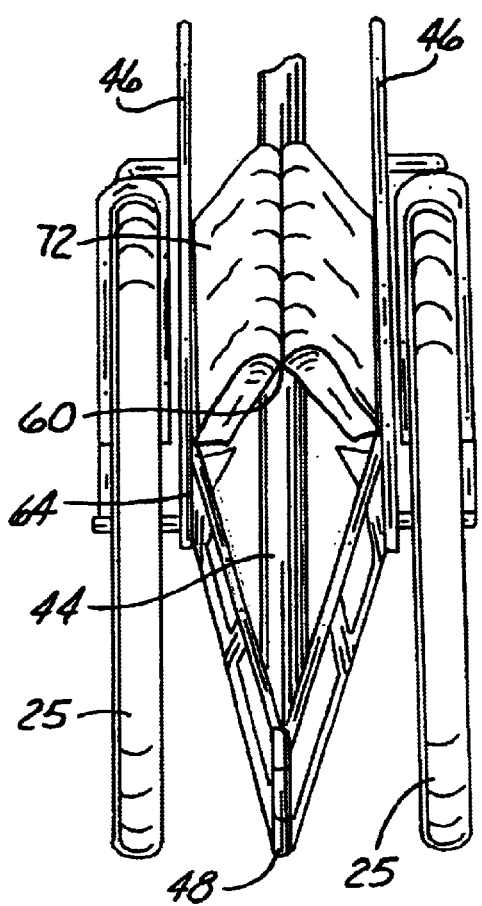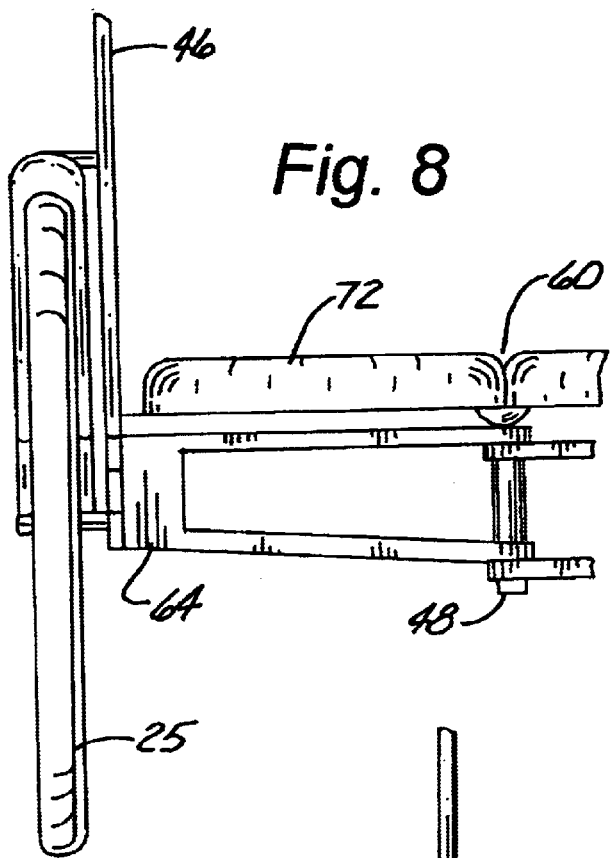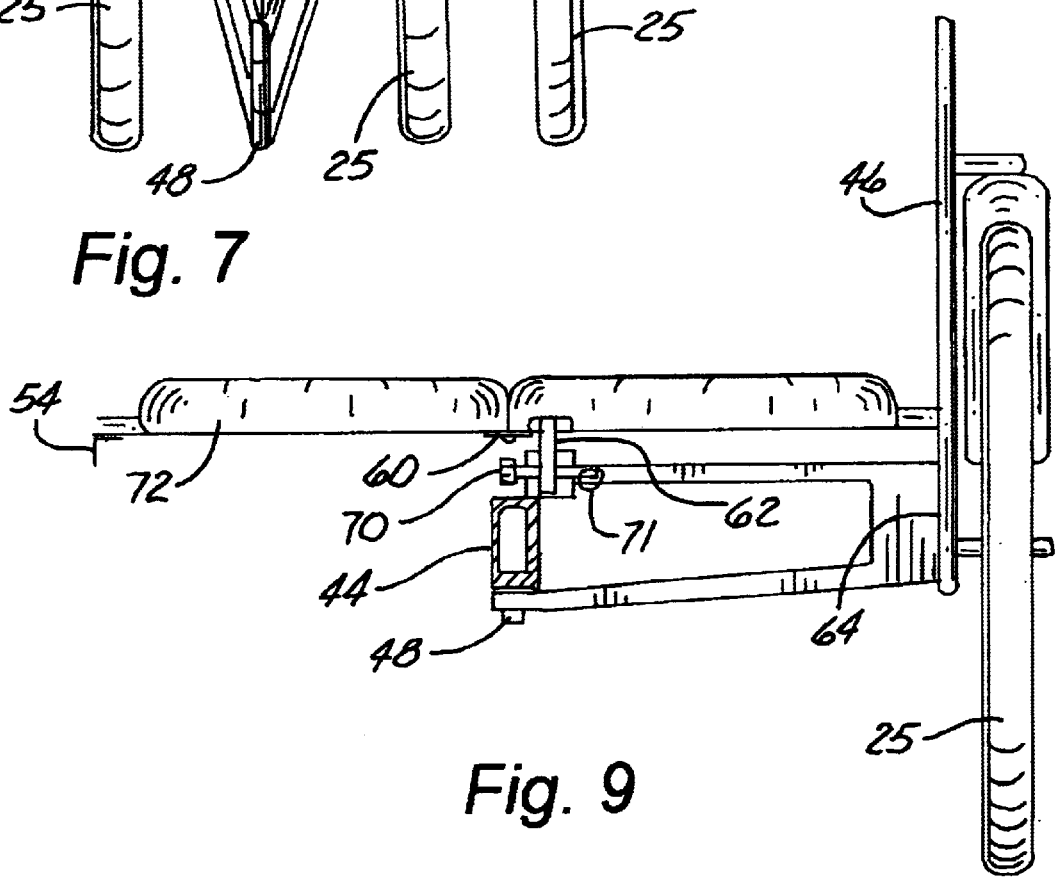
Fig. 7
Fig. 8
Fig. 9

TRANSFORMABLE TRICYCLE AND VARIATIONS

This application is a continuation of Provisional application Ser. No. 60/355,951, filed Feb. 12, 2002.

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of bicycle accessories, and more particularly to tricycles that are transformable.

2. Description of Related Art

As can be seen by reference to the following U.S. Pat. Nos. 4,451,064; Des. 425,827; 4,966,381; and 3,429,584, the prior art is replete with myriad and diverse tricycles.

While all of the aforementioned prior art constructions are more than adequate for the basic purpose and function for which they have been specifically designed, they are uniformly deficient with respect to their failure to provide a simple, efficient and practical tricycle capable of changing to accommodate one, two, or three riders, with its different versions.

As a consequence of the foregoing situation, there has existed a longstanding need for a new and improved tricycle with its versions, and the provision of such a construction is a stated objective of the present invention.

BRIEF SUMMARY OF THE INVENTION

Briefly stated, the present invention provides a wheel vehicle with a front wheel drive system and a low profile operator seat, and one with a high operator seat on one of its versions, a seat that is positioned between the rear wheels and one that is added in the middle of the rear and front frame assembly, and being selectively removable with respect to the front and rear portion of the frame.

The front wheel drive system eliminates the need for an axle with a sprocket, chain tensors, chain guides, frame bearings, and the long chain to drive the rear wheels. Thus, one saves much of the energy and it gives riders the ability to fold, extend, or change rear frame assemblies to best accommodate people's needs.

The present invention also provides a convenient way and adjustment to interchange rear end frame assemblies, to accommodate their preferences. The wheel vehicle also includes a version with a single rear wheel that is used with the same front wheel drive system.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 4 is a right side elevational view with the wheels folded inward towards the front making it narrower and shorter in length to have an easy fit in a trunk of a car;

FIG. 6 is a rear elevational view of the tricycle showing the seat folded up with a hinge at the middle and on the sides, and showing the two brackets folded forward;

FIG. 7 is an overhead view showing the axle hinge brackets that support the weight and also when extended, keep the wheels in alignment;

FIG. 8 is a partial elevational rear view of the hinge type axle brackets and the two sent sections;

FIG. 9 is a partial elevational view showing the mating engagement of the seat with the pin and the frame assembly;

DETAILED DESCRIPTION OF THE INVENTION

Figure 1:
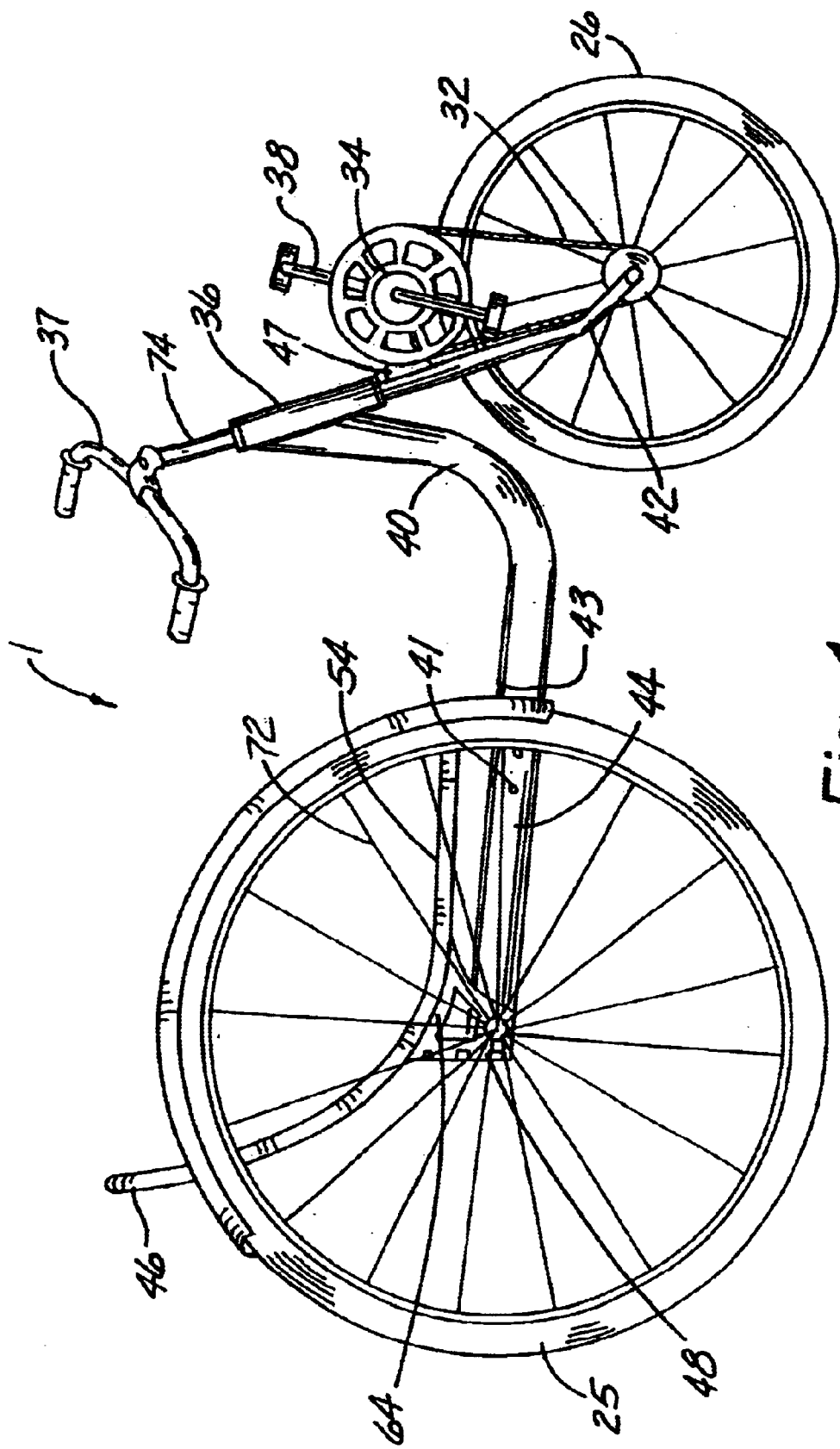
FIG. 1 is a right side elevational view of the wheeled vehicle of the present invention.

As can be seen by reference to the drawings, and in particular to FIG, 1, the tricycle that forms the basis of the present invention is designated generally by the reference number 1. The tricycle 1 includes a frame having a rear portion 44, with a foldable bracket 48 and two more brackets 54 holding a horizontal upwardly foldable seat 72. A seat back is supported by brackets 46 and 64. Two rear wheels 25 are rotatable attached to brackets 64. The frame also includes front portion 40 extending upwardly for support that carries a sleeve 36 at its upper end. A shaft 74 is journalled for pivotal movement in the sleeve 36. The upper end of the shaft 74 supports steering handle bars 37 and the lower end carries the front fork 42. A bracket 47 extends from the front fork 42 and supports a rotatable pedal crank 34. A front wheel 26 is rotatably attached to the front fork 42 and is drivable connected to the pedal crank 34 by a continuous chain 32.

Figure 2:
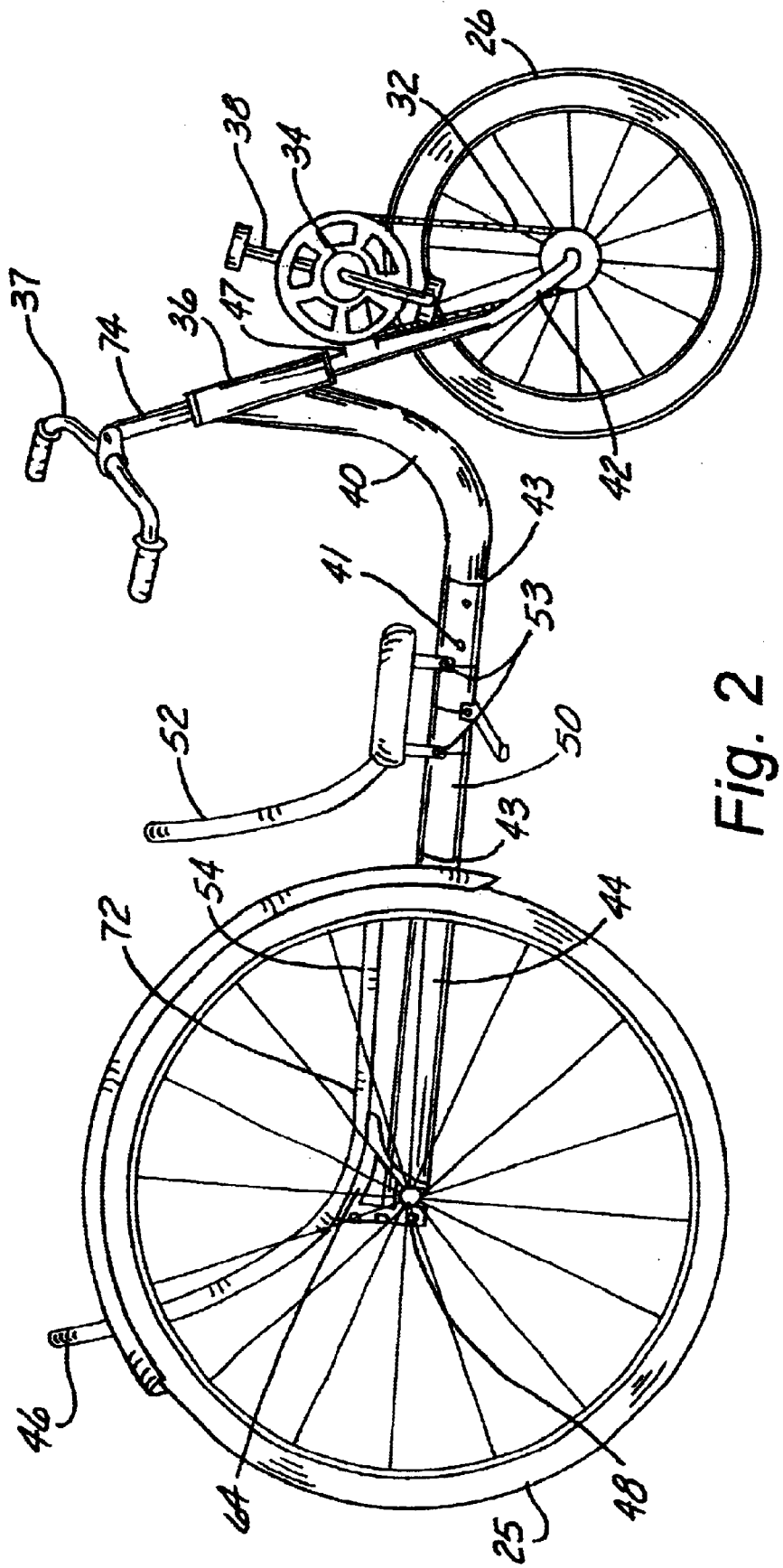
FIG. 2 is a right side elevational view of the wheeled vehicle with the additional seat and section of frame assembly.

As best shown in FIG. 2, an optional extension of the frame 50 supports an adjustable seat 52 attached by clamps 53. The frame extension 50 fits between the rear and front portions 44 and 40 of the frame.

Figure 3:
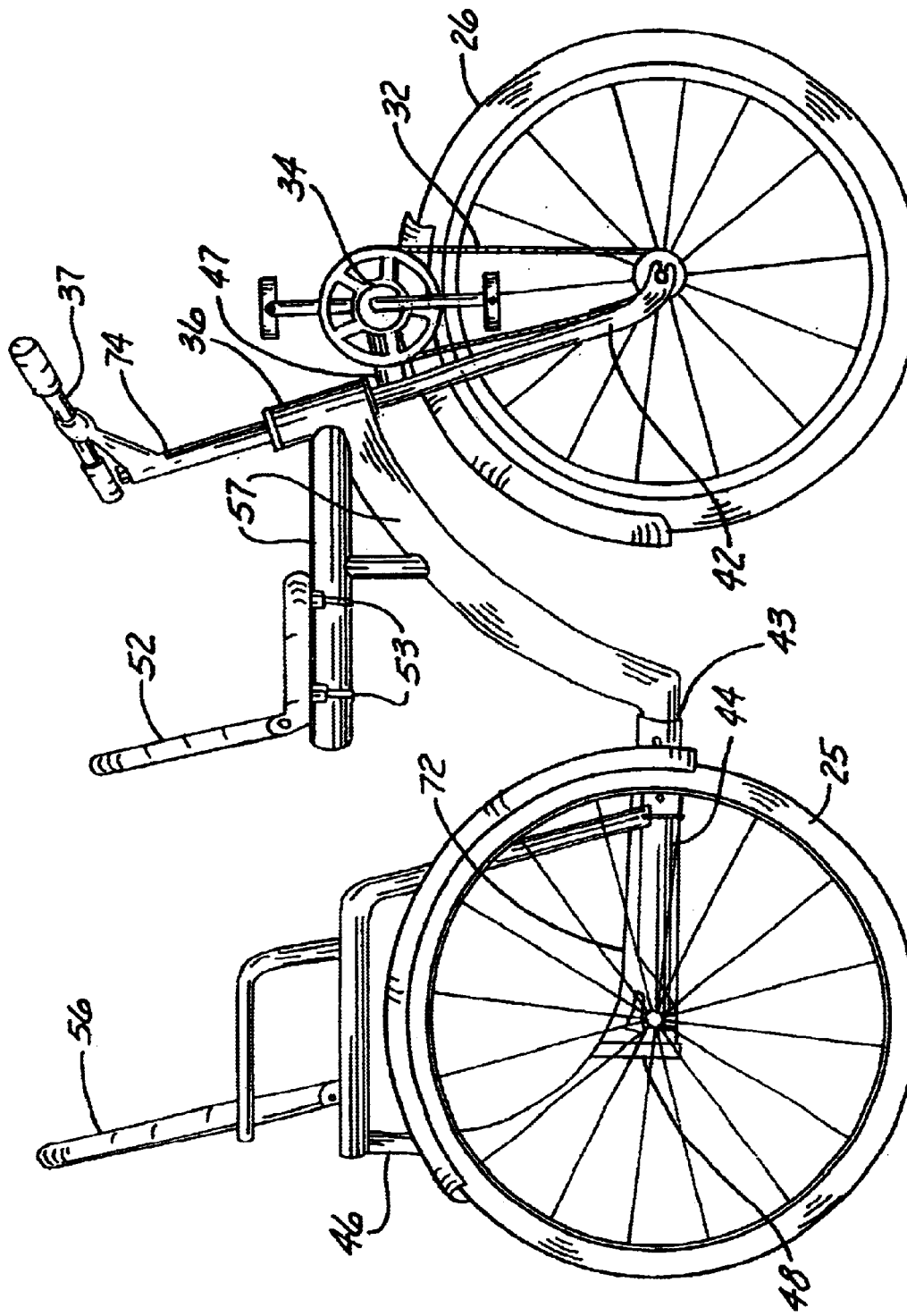
FIG. 3 is a right side elevational view showing a variation of the same front wheel drive and foldable rear frame used with a high operator seat and a bigger wheel on the front to have less drive resistance on the road.

One alternate embodiment is best shown in FIG. 3 where a bigger front frame 47 carries a seat 52 attached by clamps 53, and a bigger front wheel drive including the wheel 26. Also included is a double seat 56 mounted and supported on the upper part of the seat frame 46 and the frame section 44.

Figure 5:
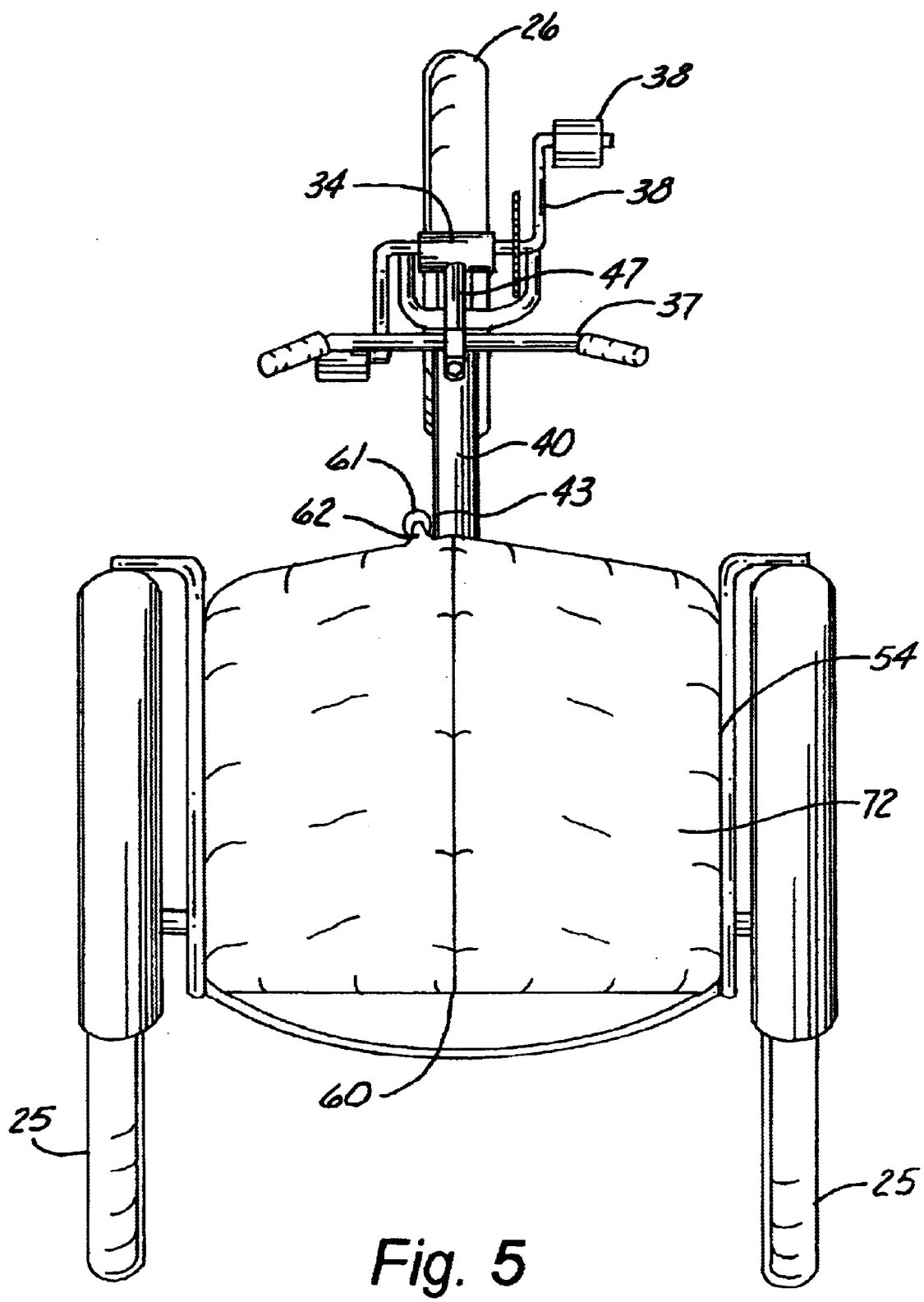
FIG. 5 is an overhead view showing the hinge partition of the seat with the locking pin on the front of the seat which keeps the wheels in perfect alignment.
Figure 10:
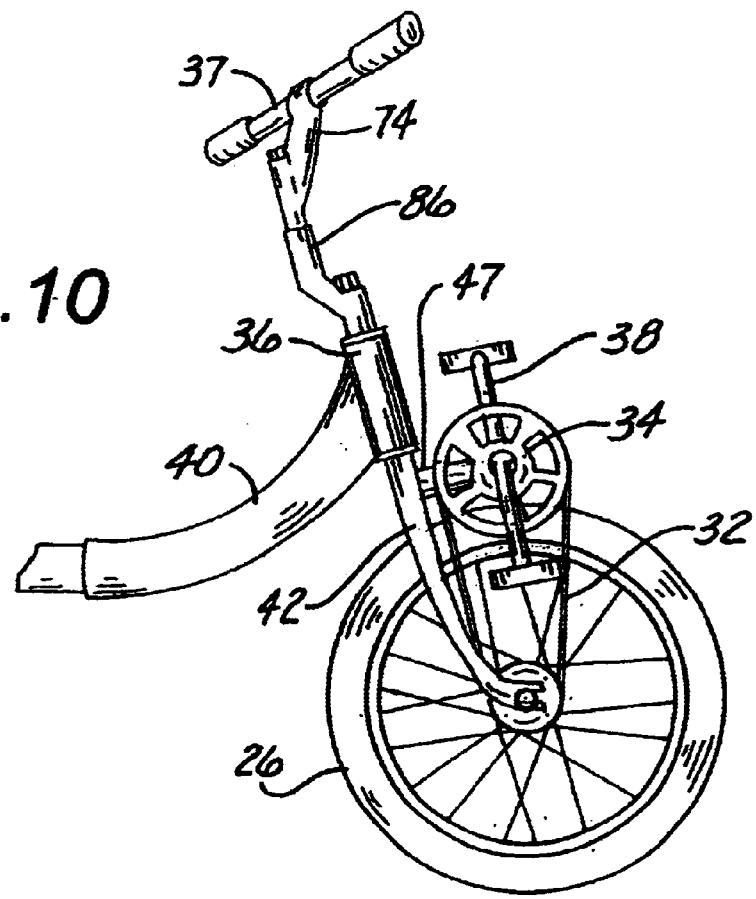
FIG. 10 is a partial right side elevational view of the front wheel drive system.
Figure 11:
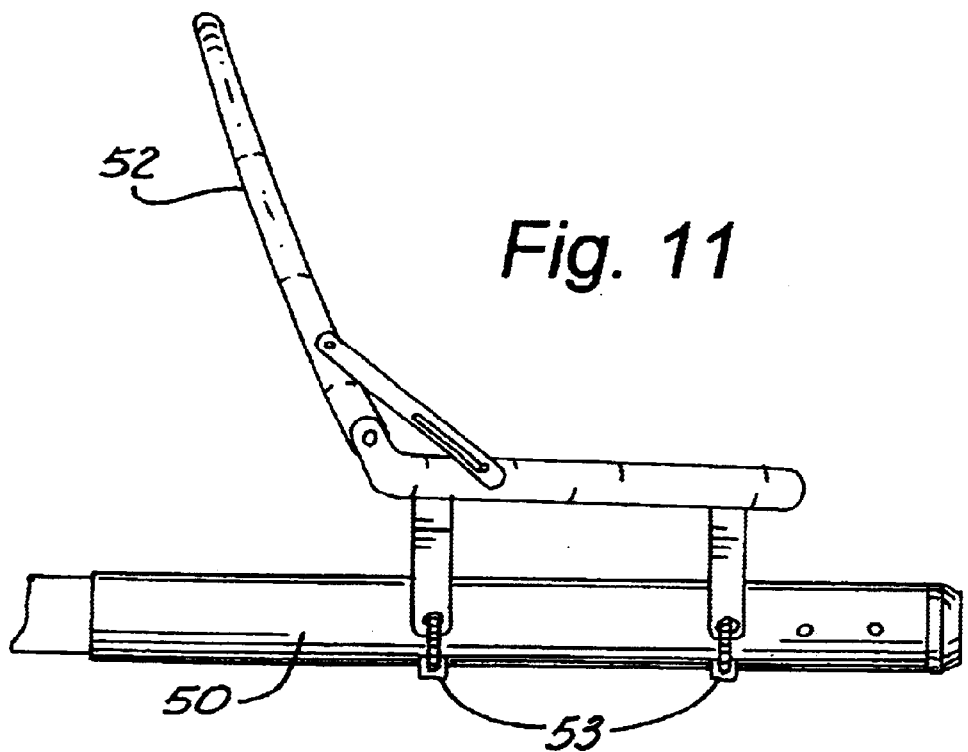
FIG. 11 is an enlarged right side elevational view of the tricycle's frame extension with the foldable seat attached on top for the second passenger.

FIG. 4 shows the tricycle 1 presented in a folded inwardly mode, as also seen in a rear view of FIG. 6. FIG. 5 is an overhead view showing the seat 74 having middle hinge 60 and side hinges 54 folded up, brackets 48 and 64 folding forward and a pin 62 securing the rear wheels 25 in alignment by mating engagement with plate 61 which receives the pin 62 and secures the seat 72.

Figure 12:
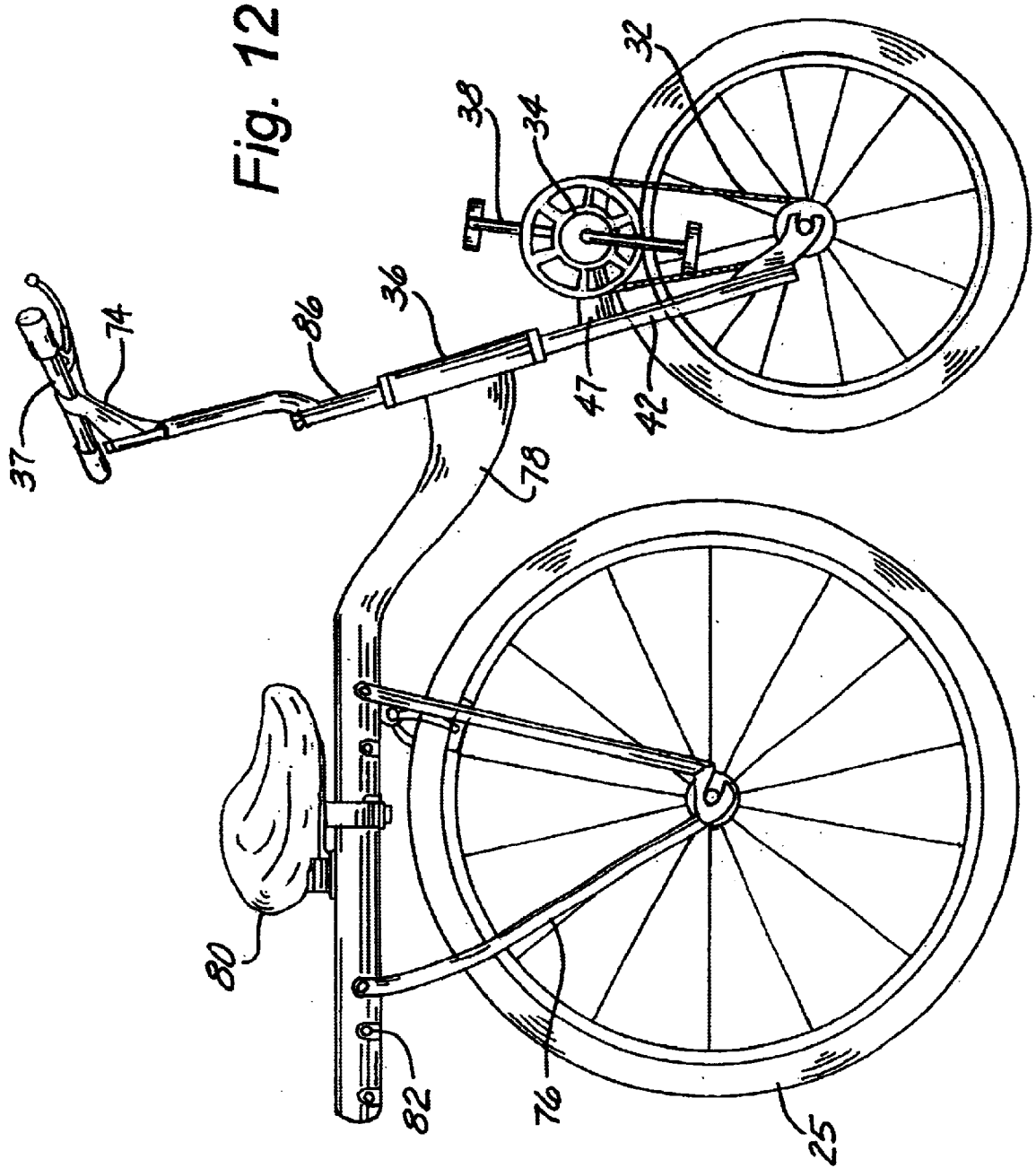
FIG. 12 is a right side elevational view of a version with the same front wheel drive frame assembly and a different rear frame assembly having a single rear wheel and adjustable forks on each side of the wheel, and a sliding seat on top of the horizontal frame assembly.

FIG. 12 shows another alternate embodiment that has the same front wheel drive frame assembly. Two forks 76 on each side of the rear wheel 25 have selectable adjustment 82 for a bigger rear wheel 25 and a slidable seat 80. A horizontal frame curves down to the sleeve 36 which carries adjustable handle bars 37 on shaft extension 74 supported by a shaft 86.

It can be seen that the present invention provides all the advantages of having different bicycles in one that transforms to accommodate people's needs and can fit easily in the trunk of a car.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. An operator powered wheeled vehicle, comprising:

a frame including a front portion having an upwardly extending support with a sleeve at the upper end, and a rear portion;

a shaft pivotally received in the sleeve, the shaft having an upper end attached to steering handle bars, and a lower end attached to a front fork;

a bracket attached to and extending up from the front fork;

a rotatable pedal crank attached to the bracket;

a front wheel rotatably attached to the front fork, and being driveably connected to the pedal crank by a continuous drive chain;

a pair of foldable bracket arms, each bracket arm having a distal end and a proximal end pivotally attached about a vertical axis to the rear portion of the frame, the bracket arm being movable between an operating position where the bracket arms are disposed perpendicular to the frame, and a storage position where the bracket arms fold forward toward the front portion of the frame;

a pair of rear wheels, each wheel being pivotally attached about a horizontal axis to the distal end of the bracket arms;

a pair of seat brackets each seat bracket being operably attached to and disposed to extend forward of the distal end of the bracket arms;

a seat having two sections, each of the seat sections being pivotally attached to the other and also pivotally attached to one of the pair of seat brackets, the seat sections being movable between a horizontal operating position, and an upwardly folded storage position; and a locking mechanism disposed to secure the seat sections in the horizontal operating position.

2. The vehicle of claim 1, further including a frame extension disposed intermediate the front and rear portions of the frame, and an auxiliary seat attached to the frame extension.

\* \* \* \* \*